United States Patent [19]

Bertrand et al.

[11] 3,899,959
[45] Aug. 19, 1975

[54] PNEUMATIC CONTROLLERS

[75] Inventors: Pierre Bertrand, Billere; Maurice Nony, Jouy-En-Josas, both of France

[73] Assignee: Compteurs Schlumberger, Montrouge, France

[22] Filed: Dec. 18, 1973

[21] Appl. No.: 425,869

[30] Foreign Application Priority Data
July 12, 1971 France.................... 71.25472

Related U.S. Application Data

[62] Division of Ser. No. 270,120, July 10, 1972.

[52] U.S. Cl............. 92/100; 92/98 R; 92/102; 137/85
[51] Int. Cl............. F01b 19/00; F16j 3/00
[58] Field of Search.......... 92/100, 102, 98 R, 98 D; 137/85

[56] References Cited
UNITED STATES PATENTS

| | | | |
|---|---|---|---|
| 3,136,130 | 6/1964 | McGay.................... | 92/100 X |
| 3,168,855 | 2/1965 | Randol.................... | 92/100 X |
| 3,205,830 | 9/1965 | Clack...................... | 92/100 X |
| 3,575,190 | 4/1971 | Puster et al............. | 137/85 |
| 3,590,694 | 7/1971 | Prescott et al.......... | 137/85 X |
| 3,661,164 | 5/1972 | Kreuter et al.......... | 137/85 |

*Primary Examiner*—Martin P. Schwadron
*Assistant Examiner*—Abraham Hershkovitz
*Attorney, Agent, or Firm*—William R. Sherman; Stewart F. Moore; Walter C. Farley

[57] ABSTRACT

A pneumatic controller providing an outgoing signal proportional to the magnitude and time integral of the incoming signal comprises a first sealed-beam balance with a rigid beam attached onto a diaphragm defining four chambers, a second sealed-beam balance with two chambers performing the flow relay function, and a pressure balance with two chambers for copying the integral pressure. In the case of a pneumatic controller providing an outgoing signal proportional to the magnitude, time integral and time derivative of the incoming signal, the first sealed-beam balance is preceded by a time derivative stage comprised of a sealed-beam balance with four chambers similar in construction to the first sealed-beam balance.

1 Claim, 16 Drawing Figures

PNEUMATIC CONTROLLERS

This is a division of application Ser. No. 270,120, filed July 10, 1972.

BACKGROUND OF THE INVENTION

1. FIELD OF THE INVENTION

This invention relates to pneumatic controller apparatus used for the control of various industrial processes.

A pneumatic controller can be defined as an apparatus which when supplied, for example from a measuring or like element, with an incoming signal M proportional to the extent to which the value of a variable of a quantity or process to be controlled has deviated from a required value will yield a pneumatic outgoing signal for utilization in a pneumatically operated regulating element adapted to restore the variable to the required value.

2. DESCRIPTION OF THE PRIOR ART

The most usual pneumatic controllers are of the "PI" (Proportional + integral) type, i.e. providing an outgoing signal proportional to the magnitude and time integral of the incoming signal, or the "PID" (proportional + integral + derivative) type, i.e. providing an outgoing signal proportional to the magnitude, time integral and time derivative of the incoming signal. The latter are commonly referred to as "three-term pneumatic controllers" and are mainly comprised of bellows having a time derivative action on the error or of diaphragms having a time derivative action on the measurement. When bellows are used, the three-term pneumatic controllers have a single PID stage and an amplifier; in the case of diaphragms, they have a separate derivative stage "D", a PI stage and an amplifier.

Bellows pneumatic controllers usually comprise a set of four bellows combined with a flapper-pivot assembly. The magnitude adjustment is mechanically set by changing the length of the lever arm. The time derivative action is carried out by introducing a time constant in the negative feedback and the time integral action is carried out by introducing a time constant in the positive feedback.

Diaphragm pneumatic controllers are comprised of a first stack of two diaphragms defining three chambers and performing a time derivative action with a limited gain and of a second stack of three symmetrically disposed diaphragms defining four chambers and performing a PI action. The four chambers receive in addition to the inhibit signal C and the negative and positive feedback signals, the outgoing signal M' of the derivative stage in the case of a PID pneumatic controller or the incoming signal M in the case of a PI pneumatic controller. The magnitude adjustment is made by modifying the positive feedback through a pressure divider bridge connected between the output pressure and the integral pressure, i.e. the delayed output pressure, copied by means of a pneumatic copier with a 1/1 gain. This pneumatic copier is used for eliminating the effect of the magnitude adjustment on the time integral adjustment.

The diaphragm pneumatic controllers, being of a more sophisticated design than that of the bellows pneumatic controllers, have the drawback of being quite complex and, therefore, have a relatively large overall size and high cost.

SUMMARY OF THE INVENTION

The object of the invention is to provide for a PI or a PID pneumatic controller with time derivative action on the incoming signal which has a miniature overall size and costs substantially less than diaphragm pneumatic controllers.

The invention resides in the substitution of the diaphragm stacks by sealed-beam balance having two or four chambers. Such sealed-beam balance mainly comprises a flexible diaphragm pressed between two metal plates cut out such that their central portion, forming a beam, is connected to the peripheral portion of the metal plates by two strips forming a hinge, the plates-diaphragm assembly being pressed between two flanges with rubber seals so as to form a system with two or four chambers.

The pneumatic controller of the present invention is either of the PI type or of the PID type with a time derivative stage followed by a PI stage, said PI stage comprising a sealed-beam balance with four chambers which carry out the PI action, a sealed-beam balance with two chambers which performs the amplification function without any permanent leak, and a pressure balance with two chambers which copies the time integral pressure.

BRIEF DESCRIPTION OF THE DRAWINGS

In order that the manner in which the foregoing and the other objects are attained in accordance with the invention can be understood in detail, a particularly advantageous embodiment thereof will be described with reference to the accompanying drawings, which form a part of this specification, and wherein.

2 is a schematic diagram of the PI stage with its flow relay, its integral pressure copier and its pressure divider bridge.

DESCRIPTION OF THE PREFERRED EMBODIMENT

Figure 1:
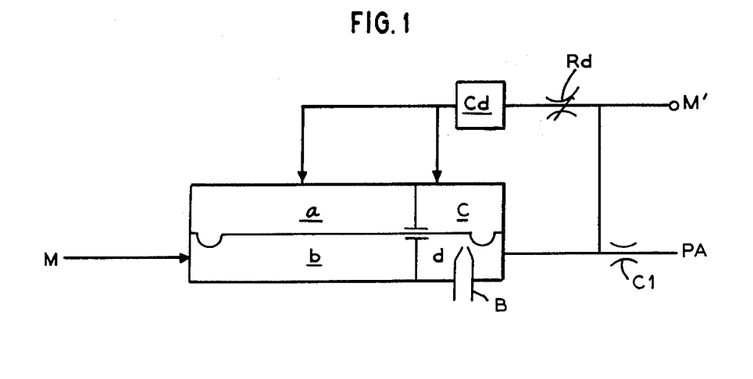
FIG. 1 is a schematic diagram of the derivative stage of a PID pneumatic controller.

FIG. 1 shows in a diagrammatic way a time derivative stage which mainly comprises the assembly of a sealed-beam balance with its four chambers $a$, $b$, $c$, and $d$. The incoming signal M is applied to chamber b and the outgoing signal M is provided by chamber $d$; the outgoing signal M' is applied to chambers a and c through an adjustable resistor $R_d$ and a capacitor $K_d$ which, in combination, delay the signal M'. The outgoing signal M' is generated in the chamber $d$ by a nozzle-vane system comprised of the nozzle B supplied at the supply pressure $P_A$ through restriction means $C_1$. The transfer function of the time derivative stage of FIG. 1 is given by the formula:

$$\frac{M'}{M} = \frac{1 + T_d P}{1 + \frac{T_d P}{k}}$$

in which $T_d$ is the time constant $R_d \times K_d$, and $p$ the Laplace variable of the transfer function.

Figure 2:
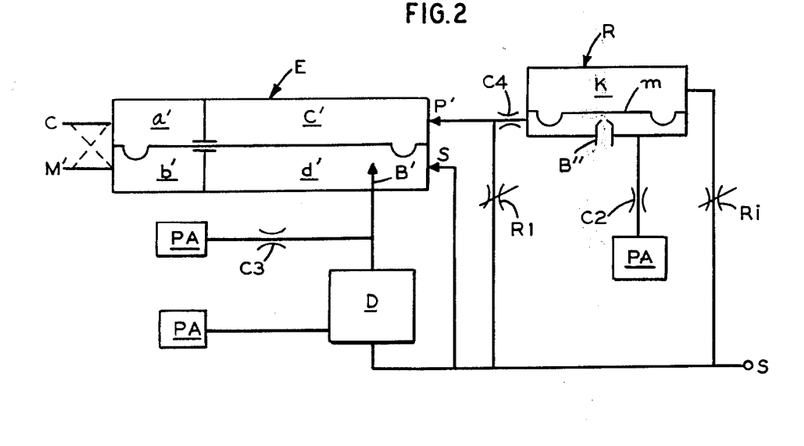

FIG. 2 shows, also in a diagrammatic way, a PI stage which comprises a sealed-beam balance shown generally as E, a pneumatic copier shown generally as R, a flow relay shown generally as D, a pressure supply shown generally as PA and resistors shown generally as capital letters R and C with subscripts.

The sealed-beam balance E comprises four chambers $a'$, $b'$, $c'$ and $d'$. The set point signal C is applied to chamger $a'$ and the incoming signal is applied to chamber $b'$. When the pneumatic controller is of the PI type, the incoming signal is the measurement signal M; in the case of a PID pneumatic controller the incoming signal is the outgoing signal M' provided by the time derivative stage shown in FIG. 1. A direct-reverse switch, schematically shown by the dotted line, enables one to reverse the direction of the pneumatic controller action. The negative feedback signal S is applied to chamber $d'$ and the positive feedback pressure P' is applied to chamber $c'$. The feedback pressure P' is defined by $$P' = gS + (1-g) S \frac{1}{1 + T_i P}$$

$T_i$ designating the time integral constant determined by the values of the capacitor K and of the adjustable resistor $R_i$, and $g$ designating a coefficient set between 0 and 1 by means of the adjustable resistor $R_1$.

The output pressure P of the nozzle-vane system B' supplied at the pressure $p_A$ through a resistor $C_3$ is applied to the input of the flow relay D supplied at the pressure $P_A$ which then provides a pressure S such that:

$$S = (P - 0.2) \text{ bars}$$

The output pressure S is supplied to the chamber $d'$. *The nozzle B' operates under a constant differential pressure of* 0.2 bars. The pressure $P_i$ is obtained through the filter comprised of resistor $R_i$ and capacitor K and is expressed by:

$$P_i = \frac{S}{1 + T_i P}$$

This pressure $P_i$ is copied with high accuracy by a pneumatic copier R using a very flexible diaphragm m and a nozzle-vane system B'' supplied at the pressure $P_A$ through the resistor $C_2$ such that cl $P'_i = P_i$ The pressure divider bridge is comprised of the fixed resistor C4 and the adjustable resistor $R_1$. This bridge is connected between S and $P'_i$. Its output pressure P' is given by:

$$P' = \frac{C_4}{R_1 + C_4} S + \frac{R_1}{R_1 + C_4} P'_i ;$$

or $$p' = gS + (1 - g) P'_i$$

The transfer function of the assembly is $$\frac{S}{M' - C} = \pm \frac{k}{1 - g} \left(1 + \frac{1}{T_i P}\right)$$

Figure 3:
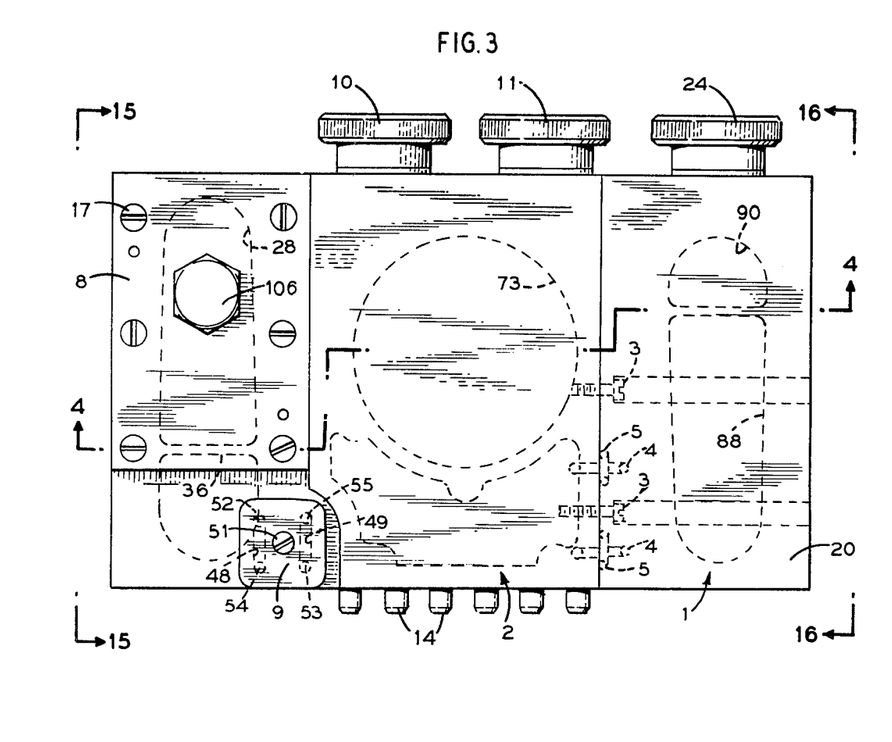
FIG. 3 is a plane view of a PID controller according to the invention.

FIG. 3 and the following represent the embodiment of a PID pneumatic controller according to the invention.

Figure 4:
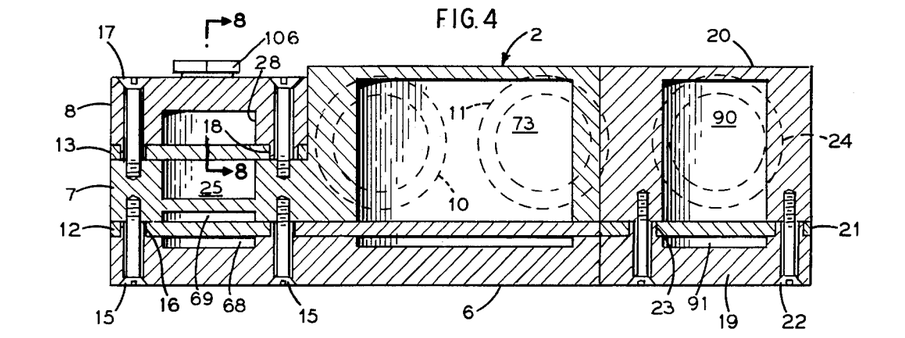
FIG. 4 is a sectional view taken along line 4—4 of FIG. 3.
Figure 5:
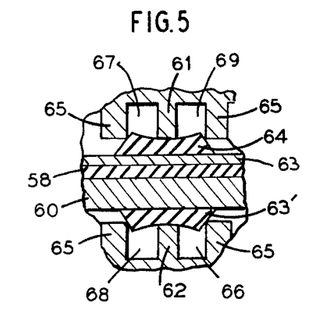
FIG. 5 is a sectional view of a hinge taken along line 5—5 of FIG. 11.

FIGS. 3, 4 and 5 show a completely assembled PID pneumatic controller formed by the combination of a time derivative stage 1 and a PI stage 2. These two stages are mechanically secured together with means of screws 3, and pneumatically connected by means of holes 4 sealed by gaskets 5. The PI stage 2 includes moulded parts 6, 7 and 8, a direct-reverse pneumatic switch 9, a knob 10 for the magnitude of proportional action, a knob 11 for the adjustment of the integral action, two beam-diaphragm assemblies 12 and 13 and bored pins 14 for the pneumatic input, output and supply connections.

The beam-diaphragm assembly 12 is pressed between the moulded pieces 6 and 7 by means of screws 15. The crushing of this assembly is limited by bosses 16 of precise height which form part of the moulded piece 6 and surround each screw 15. Likewise, the beam-diaphragm assembly 13 is pressed between the moulded pieces 7 and 8 by screws 17, and the crushing of this assembly is limited by the bosses 18.

The time derivative stage 1 is formed by two moulded pieces 19 and 20 which press a beam-diaphragm assembly 21 by means of screws 22. The crushing of this assembly is limited by bosses 23. A knob 24 permits one to adjust the magnitude of the derivative action.

Figure 6:
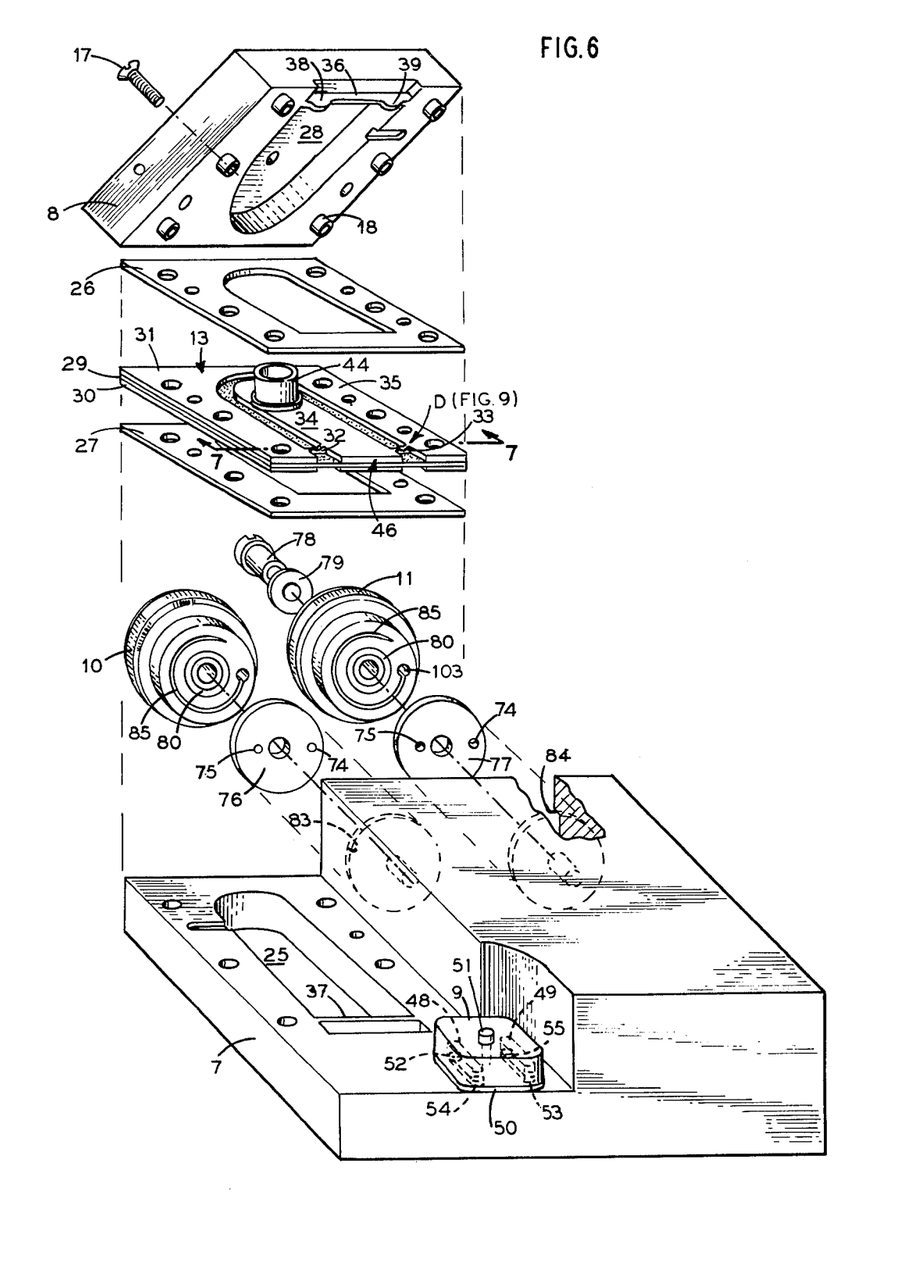
FIG. 6 is an exploded view of the flow relay.

Referring now to the exploded view of FIG. 6, the chamber 25 of the moulded piece 7 is supplied with the input pressure. This pressure acts on the beam-diaphragm assembly 13 which is pressed between the moulded pieces 7 and 8. The sealing is obtained by identical rubber seals 26 and 27. The bosses 18 go through the rubber seals 26 and 27 as well as through the assembly 13; their thickness is calculated so as to provide correct crushing of the seals. The chamber 28 is supplied with output pressure of the flow relay.

The beam-diaphragm assembly 13 is comprised of a flexible diaphragm 29 disposed between two punched metal plates 30 and 31. The pattern of these two plates is identical but their thickness is different. Plate 30 is thin and has a constant thickness. Plate 31 is thick and has two machine-finished narrow portions 32 and 33, said portions having been sufficiently thinned so as to be used as a flexible joint. The assembly operates like a rigid beam 34 articulated around the axis 7—7 in the outer edge 35. The rubber seals 26 and 27 are pressed along their outer edge 35 by means of the moulded pieces 7 and 8 as well as along the axis 7—7 by the portions 36 and 37 serving as knife-edges.

Figure 7:
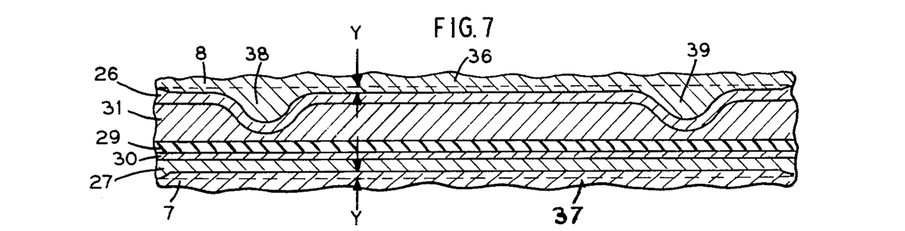
FIG. 7 is a sectional view of a sealed-beam taken along line 7—7 of FIG. 6.

Referring now to FIG. 7 which is a sectional view of FIG. 6 taken along line 7—7 the knife-edges 36 and 37 project by a value Y beyond the facing even surfaces of the moulded pieces 7 and 8. This extra thickness Y provides a greater crushing of the rubber seals 26 and 27 along line 7—7 than along the remaining part of the surface. The knife-edge 36 has two bulging portions 38 and 39 which are used to maintain tightness of the rubber seal 26 in the machine-finished portions 32 and 33 of the thick plate 31.

Figure 8:
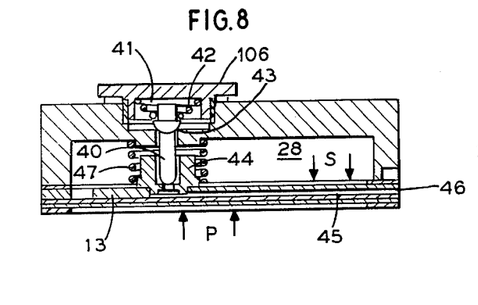
FIG. 8 is a sectional view taken along line 8—8 of FIG. 4.

The flow relay is of the type without permanent leak with double outlet-inlet valve as can be seen in FIG. 8 which is a sectional view of FIG. 4 taken along line 8—8. The supply pressure is applied through the chamber 41 formed inside the piece 106. At the rest position, a small spring 42 holds the valve 40 against the admission seat 43. The exhaust towards the open air is accomplished through a seat 44 welded on the beam 34 which has an exhaust groove 45 emerging to the open air at 46. A spring 47 provides a substantially constant offset between the output pressure $S$ prevailing in the chamber 28 and the input pressure P such that $S = (P-0.2)$ bars approximately.

The flow relay operates as follows:

If the input pressure $P$ increases, the beam 34 articulated at 7—7 moves up and opens the admission. This tends to increase $S$ until the force due to the difference in pressure $(P-S)$ acting on the beam 34 is balanced by the force of the spring 47. Then, the admission closes.

Inversely, if the pressure $P$ decreases, the beam 34 moves down and opens the exhaust, thereby decreasing $S$ until the balance is again reached.

FIG. 6 also shows the direct-reverse switch which comprises a moulded piece 9, having two channels 48 and 49, pressed on the moulded piece 7 by means of a screw 51. Sealing is obtained by a gasket 50.

The moulded piece 7 has four holes 52, 53, 54 and 55 opposite the holes of the gasket 50. The holes 52 and 53 are supplied with the measurement signal in the case of a PI pneumatic controller or the corrected measurement signal in the case of a PID pneumatic controller and the set point signal, respectively, and are in communication with the measurement and set point chambers of the pneumatic controller. In the disposition shown in FIG. 6, the measurement and set point signals are applied respectively to the measurement and set point chambers of the PI controller (direct direction). A rotation of 90° of the molded piece 9 causes the channels 48 and 49 to apply, on the one hand, the measurement signal to the set point chamber and, on the other hand, the set point signal to the measurement chamber (reverse direction).

Figure 11:
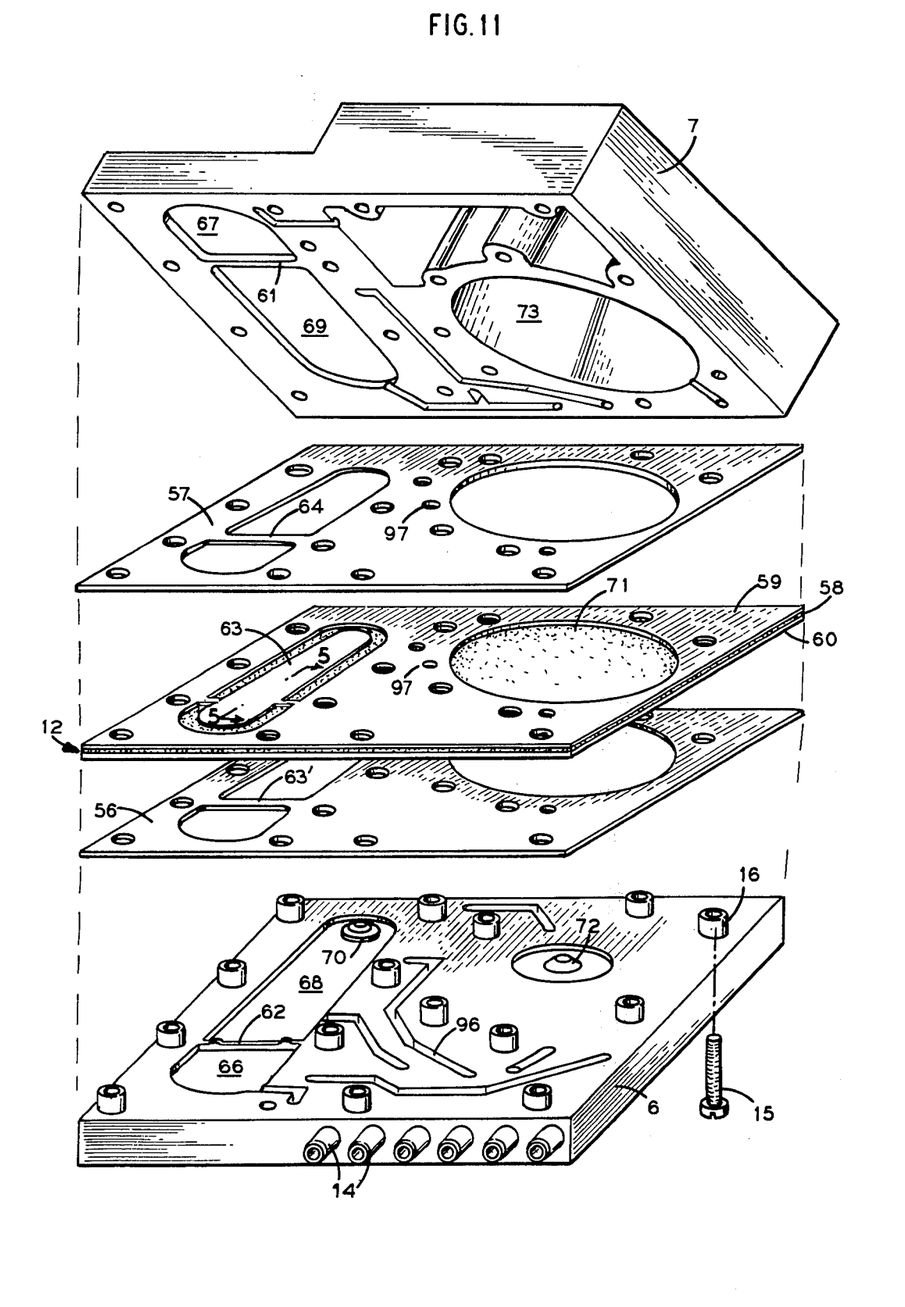
FIG. 11 is an exploded view of the PI stage.

FIG. 11 shows the PI stage which comprises a moulded piece 6, a beam-diaphragm assembly 12 pressed between two identical rubber seals 56 and 57, and another moulded piece 7.

Figure 9:
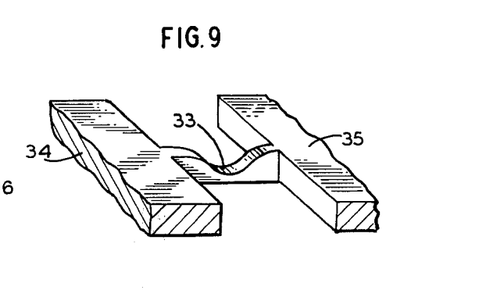
FIG. 9 is a perspective view of the hinge of a beam (detail D of FIG. 6)

The beam-diaphragm assembly metal plates, a is comprised of a flexible diaphragm 58 attached between two identical punched plates. A thin plate 59 and a thick plate 60. The thick plate 60 has two portions (not shown) that are thinned according to an arrangement similar to that of FIG. 9 in order to decrease the sitffness of the articulation. The knife-edges 61 and 62 of the moulded pieces 6 and 7 are identical to those described previously, but bosses 65 (FIG. 5) are provided in the moulded pieces 6 and 7 to prevent the narrow portions 63' and 64 of the rubber seals 56 and 57 from sliding laterally.

The moulded parts 6 and 7 are pressed against each other by screws 15 and the crushing of the rubber seals 56 and 57 is limited by bosses 16 at each screw hole.

The beam 63 pressed between the rubber seals 56 and 57 and the moulded parts 6 and 7 define four sealed chambers 66, 67, 68 and 69 corresponding to the four chambers $a'$, $b'$, $d'$ and $c'$ of FIG. 2 which receive signals $M'$, $C$, $S$ and $P'$ respectively. A nozzle 70 is supplied with the supply pressure $P_A$ through a capillary (not shown). The vane is comprised of the beam 63, and the output pressure of this nozzle-vane system is applied to the input of the flow relay.

Figure 10:
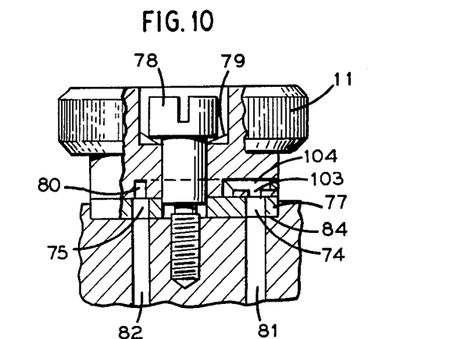
FIG. 10 is a sectional view of an adjustment knob.

The pressure copier is comprised of the circular portion 71 of the diaphragm 58. An exhaust nozzle 72 is supplied at the pressure $P_A$ through a capillary (not shown). The input pressure is applied to the chamber 73 of the moulded piece 7; the chamber 73 corresponds to the capacitor K of FIG. 2. The resistors $R_1$ and $R_i$ of FIG. 2 are made directly in the knobs 10 and 11 shown in FIG. 6. A 270° circular groove 85 of decreasing depth is provided in the knobs 10 and 11. The moulded piece 7 has two spotfacings 83 and 84 receiving the gaskets 76 and 77 on which the knobs 10 and 11 are pressed by means of the screws 78 and flexible washers 79 shown in FIG. 10. As also shown in FIG. 10, the moulded piece 7 has two holes 81 and 82 opposite the holes 74 and 75 of each gasket, respectively. The hole 74 communicates with the groove 85 of the knob while the hole 75 emerges in the deep circular groove 80 and communicates with the end 103 of the groove 85 by means of a transverse hole 104 having its outer end closed off by a ball and its inner end in communication within the deep circular groove 80. A conventional device (not shown) prevents the gaskets 76 and 77 from turning and keeps the holes 74 and 75 opposite the holes 81 and 82 respectively. The pneumatic connection between the holes 81 and 82 is thus made up of a portion of the groove 85, which portion is more or less long according to the position of the knob.

The knob 10 is equipped with a dial graduated in % (proportional adjustment) and the knob 11 is equipped with a dial graduated in minutes (integral time). It must be noted that the grooves 85 of these two knobs are not identical in size.

Figure 12:
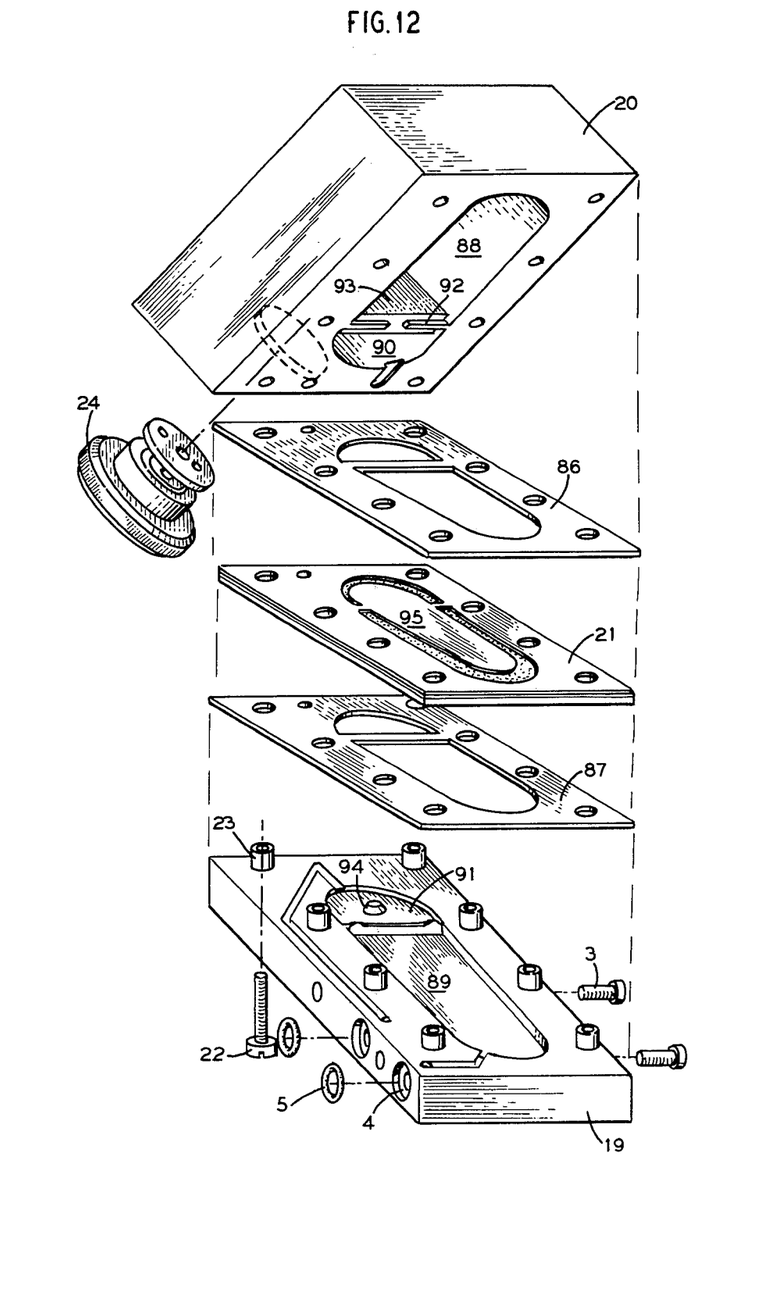
FIG. 12 is an exploded view of the derivative stage.
Figure 13:
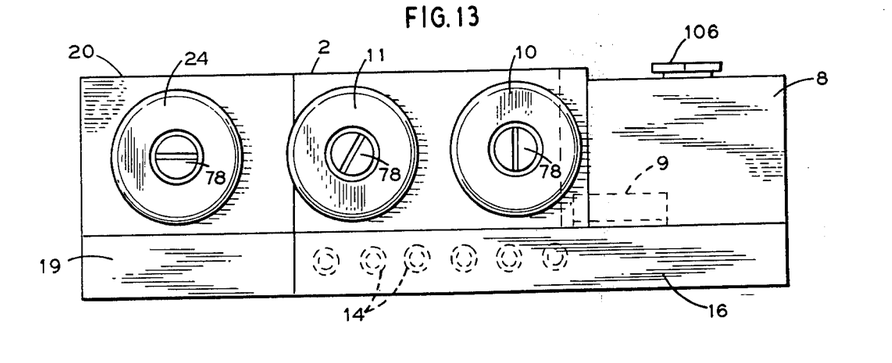
FIG. 13 is a front elevation view of the pneumatic controller according to the present invention.
Figure 14:
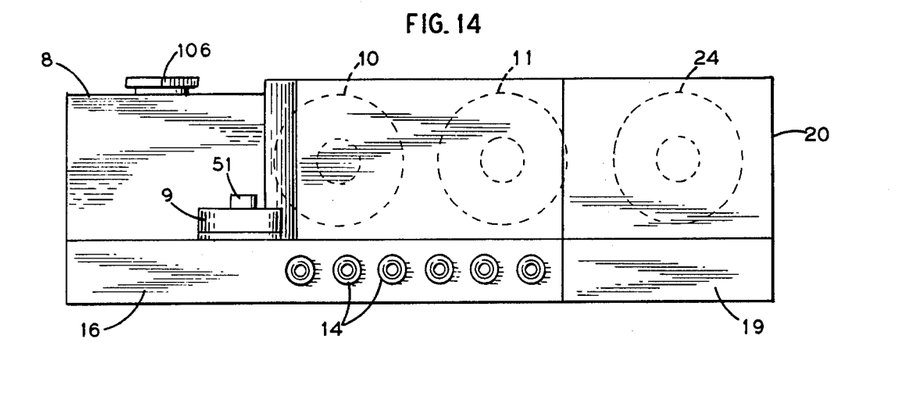
FIG. 14 is a rear elevation view of the pneumatic controller according to the invention.
Figure 15:
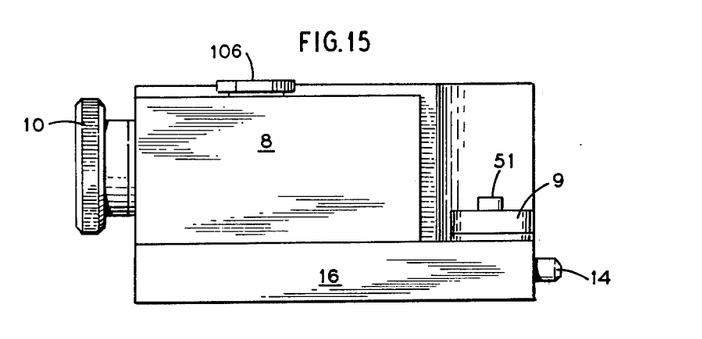
FIG. 15 is a sectional side view taken along line 15—15 of FIG. 3.
Figure 16:
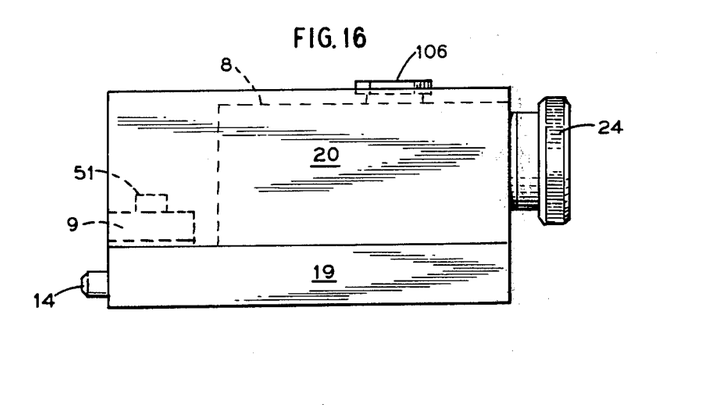
FIG. 16 is a sectional side view taken along line 16—16 of FIG. 3.

Referring now to FIG. 12, the time derivative stage D designed in accordance with the diagram of FIG. 1 comprises two moulded pieces 19 and 20 holding a beam-diaphragm assembly 21 identical to the beam-diaphragm assembly 12 (except for the copier part) between two identical rubber seals 86 and 87. This assembly thus defines four chambers 88, 89, 90 and 91 corresponding to the four chambers $a$, $b$, $c$ and $d$ of FIG. 1 respectively. The volume of the chambers 88 and 90 forms the capacitor $C_d$. These two chambers are in communication by a slit in the knife-edge 92. The rigidity of this knife-edge is provided by a moulded wall 93. The beam 95 is used as a vane for the exhaust nozzle 94. The knob 24 is used for the adjustment of the derivative action and is identical to the knob 11 for the adjustment of the integral action. In the case of a PI pneumatic controller the holes 4 of the PI pneumatic controller (FIG. 3) are closed off by balls or by a shutoff plate.

The pneumatic connections between the various parts of the pneumatic controller are established by means of channels (channel 96 of FIG. 11 for example). The sealing of the channels is provided by the seals of the beams (seal 56 of FIG. 11 for example). The communications between the channels are provided by holes, such as 97 (FIG. 11) in the seals and beam, constituting the pneumatic equivalent of a two-side printed circuit board.

The preceding description has shown that each diaphragm stack of the prior art pneumatic controllers is replaced by a single diaphragm attached on a rigid beam defining two or three measurement chambers. Each beam is held between two moulded pieces pressing rubber seals the crushing of which can be adjusted. A particular embodiment of the articulations enables to obtain both a rigid beam and a flexible and sealed articulation.

The advantages of this embodiment are very important, namely, time saving for both the assembly and adjustment, and consequently saving in cost as well as a smaller overall size and an easier maintenance.

While only one particular embodiment of the present invention and modes of practicing the invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. In a pneumatic controller of the type having a split housing and a beam structure wherein the individual portions of housing include means defining two cavities separated by inwardly protruding wall member having an edge which extends along the pivot axis of the beam, and fastener means extending through openings in the housing portions for clamping the portions thereof together, and wherein the beam structure includes a flexible diaphragm clamped between the portions of the split housing and separating it into four chambers, metal plates having outer and inner plate portions adjacent said diaphragm to render portions thereof substantially inflexible, and narrow bridge portions adjacent said edge to interconnect said outer and inner plate portions along the pivot axis, the improvements comprising thinned portions in said narrow bridge portions, in a dimention perpendicular to the major plane of the diaphragm to improve the hinge characteristics thereof; and a plurality of bosses on the surface of one of said housing portions facing the other housing portion, said beam structure having a plurality of openings and the surface of said other housing portion facing said surface of said one housing portion having a plurality of recesses, said bosses respectively protruding and mating said openings and said recesses when said pneumatic controller is assembled and the height of said bosses and the depth of said recesses being adapted to limit the crushing of said diaphragm, improving said hinge characteristics.

* * * * *